United States Patent [19]

Alvarez

[11] 4,017,555

[45] Apr. 12, 1977

[54] POLYALLOY OF POLYPHENYLENE SULFIDE AND POLYIMIDE

[76] Inventor: Robert T. Alvarez, 13382 Flint Drive, Santa Ana, Calif. 92705

[22] Filed: June 21, 1976

[21] Appl. No.: 698,441

[52] U.S. Cl. .................. 260/857 PA; 260/857 R
[51] Int. Cl.² .......................................... C08L 77/00
[58] Field of Search ................. 260/857 R, 857 PA

[56] References Cited

UNITED STATES PATENTS

| | | | |
|---|---|---|---|
| 3,504,050 | 3/1970 | Gobran | 260/857 R |
| 3,505,277 | 4/1970 | Soehngen | 260/857 R |
| 3,655,822 | 4/1972 | McGrath | 260/857 R |
| 3,658,938 | 4/1972 | Kwiatowski | 260/857 PA |
| 3,702,788 | 11/1972 | Haller | 260/857 PA |
| 3,712,932 | 1/1973 | Balme | 260/857 PA |

*Primary Examiner*—Paul Lieberman
*Attorney, Agent, or Firm*—Knobbe, Martens, Olson, Hubbard & Bear

[57] ABSTRACT

Polymeric alloys of phenylene sulfides and polyimides are disclosed.

2 Claims, No Drawings

POLYALLOY OF POLYPHENYLENE SULFIDE AND POLYIMIDE

This invention relates to polymer compositions, and more specifically, to polymer alloy compositions. More particularly, this invention relates to unique polyalloys of polyphenylene sulfide and polyimide resins which have synergistically unique melt flow and heat resistant characteristics.

Polyphenylene sulfide is a crystalline aromatic polymer which has a symmetrical, rigid backbone chain consisting of recurring para-substituted benzene rings and sulfer atoms of the general structure.

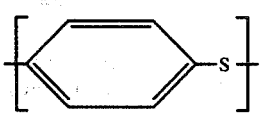

Polyphenylene sulfides have high melting points, outstanding chemical resistance, thermal stability and non-flammability. The polymer is characterized by high stiffness and good retention of mechanical properties at elevated temperature. Polyphenylene sulfide is sold by Phillips Petroleum under the trademark RYTON.

According to U.S. Pat. No. 3,354,129 polyphenylene sulfide resins (PPS resins) are produced by reacting halogen substituted aromatic compounds such as para-dichlorobenzene with alkali metal sulfide in the presence of a polar solvent. PPS resins may be non-cross linked, partially cross-linked or heavily cross-linked, as applications may require.

PPS resins are described in the aforesaid U.S. Pat. No. 3,354,129, Modern Plastics Encyclopedia, Vol. 47, No. 10A, 1970-71, Pages 208-213; the Sulfer Institute Journal, Fall, 1971, Pages 2-4.

Excellent hard, non-stick, release coatings are obtained if small amounts, 10-20% of polytetrafluoroethylene (PTFE) are blended into the PPS resin. PPS shows excellent affinity for reinforcing fibers and fillers and filled PPS resins compositions may be processed by injection or compression molding.

An unusual characteristic of the PPS polymer is the retention of mechanical properties at elevated temperatures. Both unfilled and glass filled PPS show tensile strengths of about 7000 PSI at 150° C and of about 4000 PSI at 200° C. Synthesis, physical and chemical characteristics and processing characteristics of PPS are described in the aforesaid literature references and in the technical literature generally.

Polyimides are produced by the chemical reaction of a aromatic dianhydride and an aromatic diamine. The polyimides used in the polyalloys of this invention do not melt. As polymide monomers, these materials must be fabricated by machining, punching or by direct forming techniques. Although polyimides share the linear structure of thermoplastics they are difficult to process because of their high and sometimes non-existence melting points.

Outstanding characteristics of polyimides include continuous service at 500° F, wear resistance, low friction, good strength, toughness, thermal stability, dielectric strength and radiation resistance, and low outgassing. The addition of graphite fillers to polyimide resins improves the wear resistance and lowers the coefficient of friction of the composition.

Polyimide resins are described in Modern Plastics Encyclopedia, No. 43, No. 1A, 1966, Pages 244-245, Modern Plastics Encyclopedia, No. 44, No. 1A, Pages 265-267, in Stanford Research Institute Reports, in U.S. Pat. Nos. 3,179,632, and 3,708,458, and in the patent and technical literature generally. A bearing composition obtained by alloying polyimide and polytetrafluoroethylene resins is described in U.S. Pat. No. 3,652,409.

Polyimide resins and co-polyimide resins are sold by E. I. DuPont de Nemours and Company and by the UpJohn Company, and other manufacturers. A polyimide molding powder sold under the trademark Polyimide 2080 by the UpJohn Company is described in U.S. Pat. No. 3,708,458. These molding powders are completely imidized, fully reacted aromatic polyimide resins. It is known to compound these polyimide molding powders with PTFE, graphite and molybdenum disulfide and to add fillers of chopped graphite or glass fibers, glass beads, etc. This class of polyimide resins is described in "New Thermoplastic Polyimides for High Temperature Composites" - SPI 28th Technical Conference, 1973.

Alloying of plastics is a known technique but is still largely imperical. Alloying is a process of creating a composite material by mechanically mixing or blending two or more different polymers. It differs from copolymerization in the the resulting material is produced by mechanical methods. There are three basic ways of making polymer alloys. The first technique involves creating compatible segments of polymers that are basically incompatible. This is called graph polymerization. The second alloying technique involves the use of compatibilizers. These are chemical agents that act as an intermediary between otherwise incompatible components. The third commonly used approach to producing alloys is to form cross-bonds (cross-linking) between the incompatible components. This is accomplished by creating free radicals during the alloying process. By adding radical-forming agents, such as peroxide catalysts or azo compounds. In addition, a number of alloys can be made simply by exposing the components to conditions of high shear in a compounding extruder. When the components are subjected to high shear at elevated temperature in the presence of oxygen in the compounding extruder, some cross-linking will occur between the molecules of each component. A fairly low ratio of cross-linked molecules is sufficient to produce compatible alloys.

A principal feature of this invention is that polymeric alloys of polyimide resins and polyphenylene sulfide resins are disclosed which possess surprisingly high temperature resistance characteristics, good mechanical properties at high temperatures, are easily fabricated using conventional thermoplastic fabricating techniques, and possess desirable low friction characteristics.

This invention comprises polymeric alloys of polyphenylene sulfide of the general structure alloyed with co-polyimides characterised by the presence of a recurring unit of the formula: Formula I.

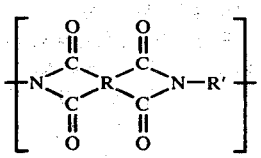

wherein R is a tetravalent aromatic radical containing at least one ring of six carbon atoms, said ring characterized by benzenoid unsaturation, the four carbonyl groups being attached directly to separate carbon atoms in a benzene ring of the R radical and each pair of carbonyl groups being attached to adjacent carbon atoms in a benzene ring of the R radical; and wherein R' is a divalent benzenoid radical selected from the group consisting of

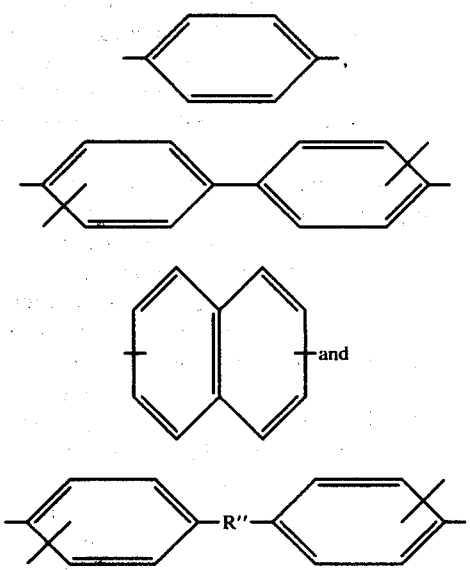

wherein R'' is selected from the group con-alkylene chain having 1-3 carbon atoms, and

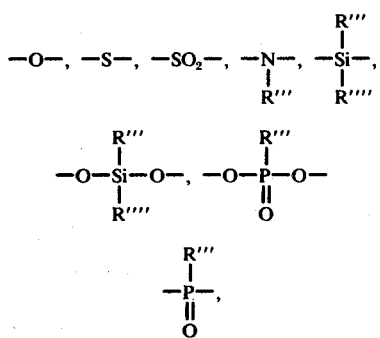

wherein R''' and R'''' are selected from the group consisting of alkyl and aryl.

In both of the foregoing structural formulae, $n$ is a positive integer selected to result in a polymer which is thermally stable at temperatures of at least about 200° C.

In one preferred embodiment, the polyimide is of the structural formula

Formula II.

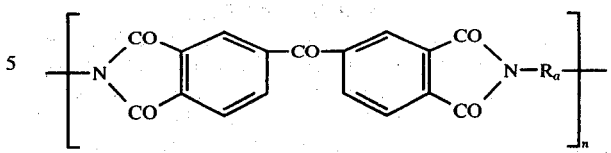

wherein from 10 to 90 percent of said recurring units are those in which $R_a$ represents:

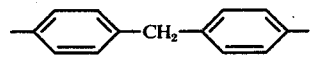

and the remainder of said units are those in which R represents a member selected from the group consisting of:

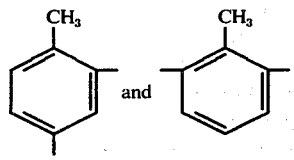

and mixtures thereof; $n$ having the meaning previously given.

These co-polyimides are prepared according to the methods described in U.S. Pat. No. 3,708,458.

The method of polymerizing to form the polyamide-acids is well-known and does not form a part of this invention. Reference is made to the aforementioned patents and publications, specifically U.S. Pat. Nos. 3,652,409; 3,179,632; and 3,708,458 for details of the synthesis of polyimides of the type described.

One of the major drawbacks of aromatic polyimides is their inherent lack of processibility. Although they possess excellent oxidative and thermal degradation resistance, it is virtually impossible to mold the material by conventional processing. It was conceived that these inherently poor processing properties could be overcome by the alloying of an engineering thermoplastic with the aromatic polyimides to produce a processable polymer alloy. It was hoped that the polyalloy would possess some of the advantageous characteristics of the polyimide and yet possess the processing characteristics of the engineering polymer. Since polymer alloying is a largely imperical art, it is impossible to predict with any degree of confidence the outcome of a given proposed alloy. Polyphenylene sulfide was chosen as potentially being a likely candidate. While the properties of the polyalloy could not be predicted from the choice of polyimide and polyphenylene sulfide, it was hoped that some of the engineering characteristics of both polymers would be retained and that a balance could be achieved between the advantageous properties of both polymers. Polyphenylene sulfide is extremely resistant to high temperatures. For example, thermogravametric analysis of PPS in nitrogen or in air indicates no appreciable weight loss below 500° C. Secondly, PPS processing temperatures where within the general processing characteristics of aromatic polyimides, insofar as temperatures and thermal stability. To determine whether a polyalloy could be prepared, the following experiments were conducted:

EXPERIMENT I

A polyalloy comprised of an aromatic polyimide made by the reaction of a compound such as 3,3', 4 4'-benzophenonetetracarboxylic acid dianhydride with a compound such as toluenediisocyanate and a compound such as 4,4' methylenebis (phenylisocyanate) and polyphenylene sulfide was used. The polyimide is commercially produced by UpJohn Company under U.S. Pat. No. 3,708,458. It is sold under the tradename of Polyimide 2080. The polyphenylene sulfide is commercially produced by Phillips Petroleum under the tradename of Ryton. For simplicity the polyimide used in the experiments will be referred to as Polyimide 2080.

To determine the compatability of polyphenylene sulfide with an aromatic polyimide such as UpJohn Polyimide 2080, the following test was conducted:

A blend of 45% by weight of polyphenylene sulfide and 55% by weight of Polyimide 2080 was blended in a twin shell blender. The blend was then predried in an oven for 2 hours at 120°–140° C. A one inch diameter rod was molded using the following process;
 a. load mold and press to 4000 PSI
 b. heat mold to 620°–640° F; hold at temperature for 10–15 minutes
 c. cool mold to 250° F and remove part A molded part with physical integrity was produced. This clearly illustrated that both polyphenylene sulfide and Polyimide 2080 were compatible and processable as an alloy.

A melt index test was conducted on the Polyimide 2080 polyphenylene sulfide blend. The blend had the following melt indexes:

| Temperature/Load | Melt Index |
|---|---|
| 300C | |
| 2160 grams | |
| 35 pounds | 1.777 grams/10 minutes |
| 320C | |
| 2160 grams | 0.2140 grams/10 minutes |
| 35 pounds | 5.0575 grams/10 minutes |

UpJohn 2080, under the same condition showed no flow. This illustrated that the alloy of Polyimide 2080 and polyphenylene sulfide does possess melt flow properties.

EXPERIMENT II

A second experiment was conducted to determine physical properties of a polyphenylene sulfide and polyimide alloy. A blend of 40% by weight of polyphenylene sulfide and 60% by weight of UpJohn's Polyimide 2080 was blended in a twin shell blender for 15 minutes. The blend was then dried in an oven for 2 hours at 120°–140° C. A one inch diameter rod was molded using the following procedure:
 a. load mold and press to 4000 PSI
 b. heat mold to 620°–640° F; hold at temperature for 15 minutes
 c. cool mold to 250° F and remove part.

Micro tensile bars were then machined from the rod and tested for tensile strength and elongation.

| Tensile strength PSI | 4,800 to 6,200 |
|---|---|
| Elongation % | 3 to 5 |

This was positive and conclusive data illustrating that an alloy system with physical integrity could be produced from an aromatic polymide and PPS.

EXPERIMENT III

The next series of tests were to determine melt flow characteristics of both polyphenylene sulfide and UpJohn Polyimide 2080. A brabender was used to conduct these tests:

Temperature 650° F at 63 rpm
Charge 55 grams
Polyimide 2080  Percentage  Ryton PPS
50/50

| Time Minutes | TORQUE (meter/grams) | | | | |
|---|---|---|---|---|---|
| | 0/100 | 10/90 | 20/80 | 50/50 | 55/45 |
| 0 | 2400 | 700 | 700 | 2000 | 2300 |
| 5 | 900 | 150 | 200 | 1100 | |
| 10 | 700 | 150 | 300 | 1200 | |
| 15 | 600 | 200 | | 1300 | 1200 |
| 20 | 600 | 200 | 400 | 1400 | 1250 |
| 25 | | 300 | | 1500 | |
| 30 | | 350 | | 1550 | 1600 |
| 35 | | 400 | 600 | 1700 | |
| 40 | | | 700 | 1900 | 1900 |
| 45 | | | 750 | 2000 | |
| 50 | | 600 | 800 | 2050 | |
| 55 | | | 900 | 2100 | |
| 60 | | 700 | 1000 | 2250 | 2060 |
| 65 | | | 1100 | 2275 | |
| 70 | 650 | 750 | 1200 | 2300 | |
| 75 | | | 1300 | 2500 | |
| 80 | | 900 | 1400 | 2600 | 2550 |
| 85 | | | 1500 | 3000 | |
| 90 | 700 | 1050 | 1700 | 3200 | 3000 |
| 95 | | | | 3400 | |
| 100 | | 1200 | | 3450 | 3500 |
| 105 | | | | 3450 | |
| 110 | | 1250 | | | |

| Time Minutes | TORQUE (meter/grams) | | | |
|---|---|---|---|---|
| | 60/40 | 70/30 | 80/20 | 90/10 |
| 0 | 2500 | 2000 | powder | powder |
| 5 | 1350 | 1800 | poor melt | |
| 10 | 1400 | 1900 | | |
| 15 | | 2250 | | no |
| 20 | | 2400 | | adequate |
| 25 | | 2550 | | melt |
| 30 | | 2700 | | |
| 35 | | | | |
| 40 | 1900 | | | |
| 45 | | 3200 | | |
| 50 | 2150 | | | |
| 55 | | | | |
| 60 | 2500 | | | |
| 65 | | | | |
| 70 | | 3500 | | |
| 75 | 3000 | | | |
| 80 | 3250 | | | |
| 85 | | | | |
| 90 | 3200 | | | |
| 95 | | | | |
| 100 | | | | |
| 105 | | | | |
| 110 | | | | |

The UpJohn Polyimide 2080 did not melt and broke the shear pin on the brabender tester.

The 90/10 blend had no adequate melting and the 80/20 blend was marginal.

These tests clearly illustrated that a polyalloy based on an aromatic polyimide, such as UpJohn PI-2080 and polyphenylene sulfide would produce a melt processable polymer system.

EXPERIMENT IV

With the determination of melt flow characteristics an alloy of 60%, by weight, UpJohn's Polyimide 2080, and 40% by weight polyphenylene sulfide was injection molded.

A 5 ounce Reed reciprocating screw injection molding machine fixed with an ASTM test specimen mold was used to conduct injection molding tests.

Molding conditions were set as follows:

| Barrel Temperature | 560° to 620° F |
|---|---|
| Mold temperature | 200° to 300° F |

Injection molded parts illustrated the following physical properties:

| Tensile strength PSI | 4,232 |
|---|---|
| Elongation % | 2.66 |
| Flexural strength | 8,732 |

EXPERIMENT V

To determine the high temperature properties of the polyalloy of aromatic polyimide and PPS, the standard ASTM test No. D 648-72, heat distortion test was conducted.

| | 264 PSI load | | |
|---|---|---|---|
| Test condition | 0/100 | 20/80 | 60/40 |
| Heat Distortion Temperature ° C | PPS 130.5(1) | 225 | 276 |

(1)Obtained from Phillips Petroleum's Ryton data.

Heat distortion data showed that the aromatic polyimide/PPS alloy had a significant difference in load versus heat.

EXPERIMENT VI

To further illustrate the aromatic polyimide/PPS alloy, a blend of polypyromellitimide of 4,4' oxydianiline was obtained by precipitating the resin from commercially available polyimide varnish. The varnish is produced by DuPont under the tradename of Pyre-ML. Pyre-ML polyimide varnish is based on polypyromellitimide of 4,4' oxydianiline. See U.S. Pat. No. 3,179,632.

The polyimide was prepared by adding 16 ounces of Pyre-ML varnish to 32 oz. of water and agitated in a Waring blender. The powder was then filtered and washed two additional times with water. The powder was then dried at 250° F for 24 hours, and at 500° F for an additional 24 hours.

An alloy of 60% by weight of polypyromellitimide of 4,4' oxydianiline and 40% by weight of PPS was produced by tumbling.

Brabender tests were then conducted to illustrate melt processability.

| Condition | 650° F at 63 rpm |
|---|---|
| Charge | 53 grams |
| Time | TORQUE (meter/grams) |
| 0 | 800 |
| 10 | 500 |
| 15 | 700 |
| 20 | 850 |
| 25 | 1000 |
| 30 | 1200 |
| 35 | 1500 |
| 40 | 1800 |
| 45 | 1900 |
| 50 | 2100 |
| 52 | 2300 |
| 55 | cured |

Again a polyalloy based on aromatic polyimide and PPS does produce a melt processable alloy.

EXPERIMENT VII

A conventional usage of engineering plastics is for bushings. A bearing composition of:
- 15% by wt. graphite
- 51% by wt. PI-2080
- 34% by wt. PPS was blended in a twin shell blender for 20 minutes. The composition was then molded and bushings were machined.

A bearing test was conducted for 42.25 hours at an operating P.V. factor of 5,000. The bushing was ½ inch diameter by ½ inch long.

It will be understood that the foregoing examples are illustrative of the invention and do not limit the scope thereof. Variations in processing technique and in the selection of polyphenylene sulfides and polyimides, within the classes defined hereinbefore, are well within the skill of the art and are contemplated by the invention, the limitations of which are defined in the following claims.

I claim:

1. A polymeric alloy of polyphenylene sulfide having recurring units of the formula:

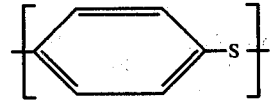

wherein n is a positive integer selected to result in a polymer which is thermally stable at at least about 200° C. and a polyimide having recurring units of the formula

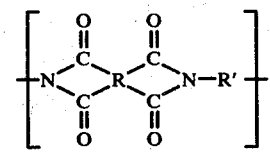

wherein R is a tetravelent aromatic radical containing at least one ring of six carbon atoms, said ring characterized by benzenoid unsaturation, the four carbonyl groups being attached directly to separate carbon atoms in a benzene ring of the R radical and each pair of carbonyl groups being attached to adjacent carbon atoms in a benzene ring of the R radical; and wherein R' is a divalent benzenoid radical selected from the group consisting of

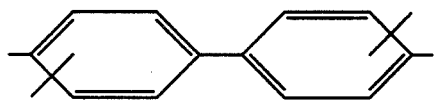

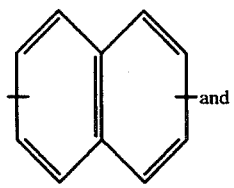 and

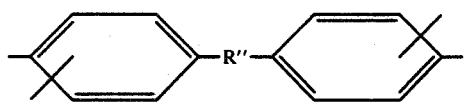

wherein R'' is selected from the group con-alkylene chain having 1–3 carbon atoms, and

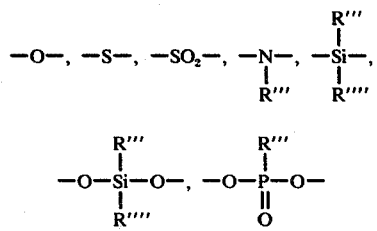

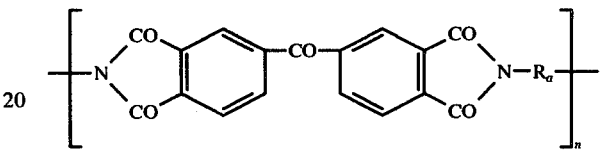

wherein R''' and R'''' are selected from the group consisting of alkyl and aryl, and $n$ is a positive integer high enough to result in a polymer which is heat stable to at least about 200° C., said alloy being characterized by possessing melt flow properties at temperatures about about 300° C.

2. The polymeric alloy of claim 1 wherein the polyimide has recurring units of the formula

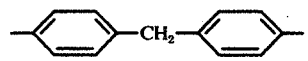

wherein from 10 to 90 percent of said recurring units are these in which $R_a$ represents

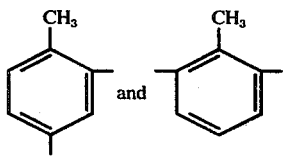

and the remainder of said units are those in which R represents a member selected from the group consisting of

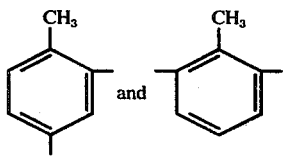

and mixtures thereof, $n$ being a positive integer as defined in claim 1.

* * * * *